United States Patent [19]
Jiradejnunt et al.

[11] Patent Number: 5,730,309
[45] Date of Patent: Mar. 24, 1998

[54] CONTAINER WITH LID STRONGLY LOCKABLE THERETO

[75] Inventors: Prajak Jiradejnunt, Bankok; Glenn N. Tyler, Bangkok, both of Thailand

[73] Assignee: Poranunt Co., Ltd., Bangkok, Thailand

[21] Appl. No.: 528,111

[22] Filed: Sep. 14, 1995

[30] Foreign Application Priority Data

Oct. 13, 1994 [MY] Malaysia ............ PI 940 2728

[51] Int. Cl.⁶ .................................................. B65D 17/40
[52] U.S. Cl. .......... 220/276; 206/503; 215/DIG. 1; 215/354; 220/790; 220/796; 220/800; 220/802
[58] Field of Search ............... 220/276, 306, 220/307, 780, 781, 784, 787, 789, 790, 792, 796, 799–802; 206/503, 515; 215/254, 256, 40, 305, 354, DIG. 1

[56] References Cited

U.S. PATENT DOCUMENTS

| | | | |
|---|---|---|---|
| 3,107,838 | 10/1963 | Brys et al. | 220/800 X |
| 3,532,244 | 10/1970 | Yates, Jr. | 220/306 X |
| 3,811,597 | 5/1974 | Frankenberg et al. | 220/306 X |
| 4,034,889 | 7/1977 | Hammes et al. | 220/306 |
| 4,538,741 | 9/1985 | Jacobs | 220/792 X |
| 4,919,286 | 4/1990 | Agbay, Sr. | 215/256 X |
| 5,092,478 | 3/1992 | La Pierre | 220/276 X |
| 5,143,219 | 9/1992 | Yates, Jr. | 220/306 X |
| 5,143,235 | 9/1992 | Repp | 215/256 |
| 5,163,576 | 11/1992 | Galer | 220/792 |
| 5,292,024 | 3/1994 | Koefelda et al. | 220/306 X |
| 5,460,287 | 10/1995 | Cargile et al. | |

Primary Examiner—Allan N. Shoap
Assistant Examiner—Robin A. Hylton
Attorney, Agent, or Firm—Lowe, Price, LeBlanc & Becker

[57] ABSTRACT

A container lid and container body locking mechanism includes a plurality of annular flanges and annular notch rings respectively and spaced apart in a pre-determined configuration so as to provide a tight leak-proof seal when the lid is fitted over the container body. A tamper proof detachable strip is provided in the container lid.

14 Claims, 8 Drawing Sheets

CONTAINER WITH LID STRONGLY LOCKABLE THERETO

FIELD OF THE INVENTION

The invention relates to a container and in particular to a container lid and container body locking mechanism which mechanism will prevent contents from the container body from flowing out when the container body is displaced from its vertical axis. The invention further relates to a container lid and container body locking-mechanism which does not separate or leak when the container is subjected to a fall from a height of about 5 meters.

BACKGROUND OF RELATED ARTS

Ordinary plastic bucket containers with covers suffer distinct disadvantages. Typical Covered bucket containers normally cannot effectively be resealed after the cover has been opened once. Bucket containers which have effective sealing devices are usually elaborately designed and are relatively expensive. Further the conventional plastic bucket locking mechanism cannot withstand force exerted externally during normal use. Conventional plastics buckets also are not capable of being stacked on top of another in a warehouse, as the lower units get out of shape or become distorted.

SUMMARY OF THE INVENTION

It is a principal object of the present invention to provide a container cover and container body locking mechanism whereby a tight and leak proof seal is created.

It is another object of the present invention to provide a container cover and container body locking mechanism which can withstand a strong force applied along the vertical and/or radial axis of the locking mechanism.

Other objects of the present invention are to provide a sealable container to hold flowable substances, which is inexpensive to manufacture, reusable to provide an airtight or liquid tight locking mechanism a great number of times and functions efficiently, easily and reliably when sealed.

A preferred embodiment of the invention has a sealable container comprising a container body and a cover lid sealingly fittable thereto. The container body has an open top with a rim therearound, a plurality of annular flanges spaced apart in a selected spatial relationship and extending radially outwards from the external wall of container body. The flanges are integrally formed with the container body. The annular flange which is furthest from the rim includes an annular skirt extending radially outwards from an underneath part of the furthest annular flange. The cover lid has an annular skirt which includes a plurality of annular rings formed thereon in the same spatial relationship as that of the annular flanges of the container body, whereby each of the annular rings is snap fastenable over a corresponding annular flange. The cover lid further includes an annular curtain disposed from an undersurface of the lid and configured to fit in a tight fitting contact with an inner wall of the container body.

In another aspect of the invention a plurality of first fins are disposed between the annular skirt of the container body and the external wall of the container body, the fins being integrally formed with the annular skirt and the container body. A plurality of second fins are disposed between an annular curtain of the lid and an underneath portion of the lid cover, the first and second fins being integrally formed with the lid cover and the annular curtain respectively.

The annular skirt of the cover lid includes a tear-off annular strip formed by an annular groove above the penultimate annular ring.

BRIEF DESCRIPTION OF THE DRAWING

In order that the invention may be easily understood and carried into effect, it will now be described with reference to the accompanying drawings as an example of an embodiment of the invention, wherein.

DETAILED DESCRIPTION OF THE PREFERRED EMBODIMENT

Figure 1:
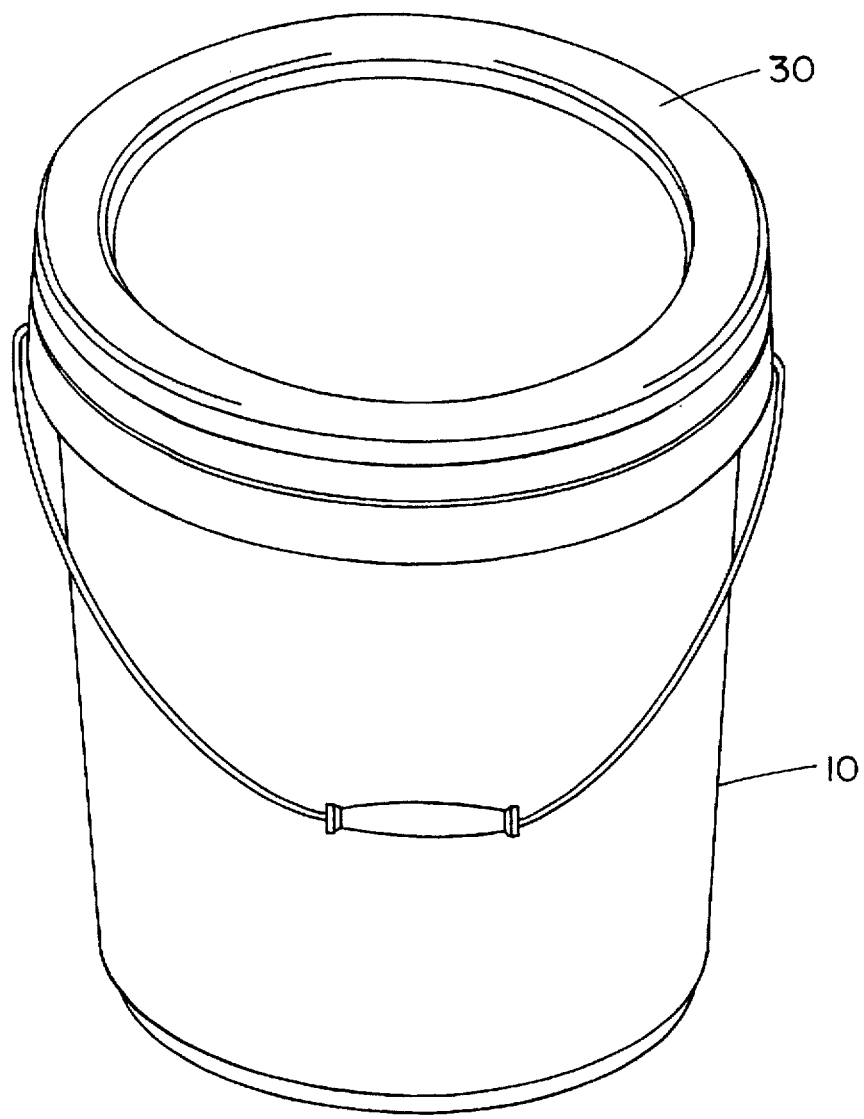
FIG. 1 is a perspective view of an embodiment of the container and cover in use.
Figure 2:
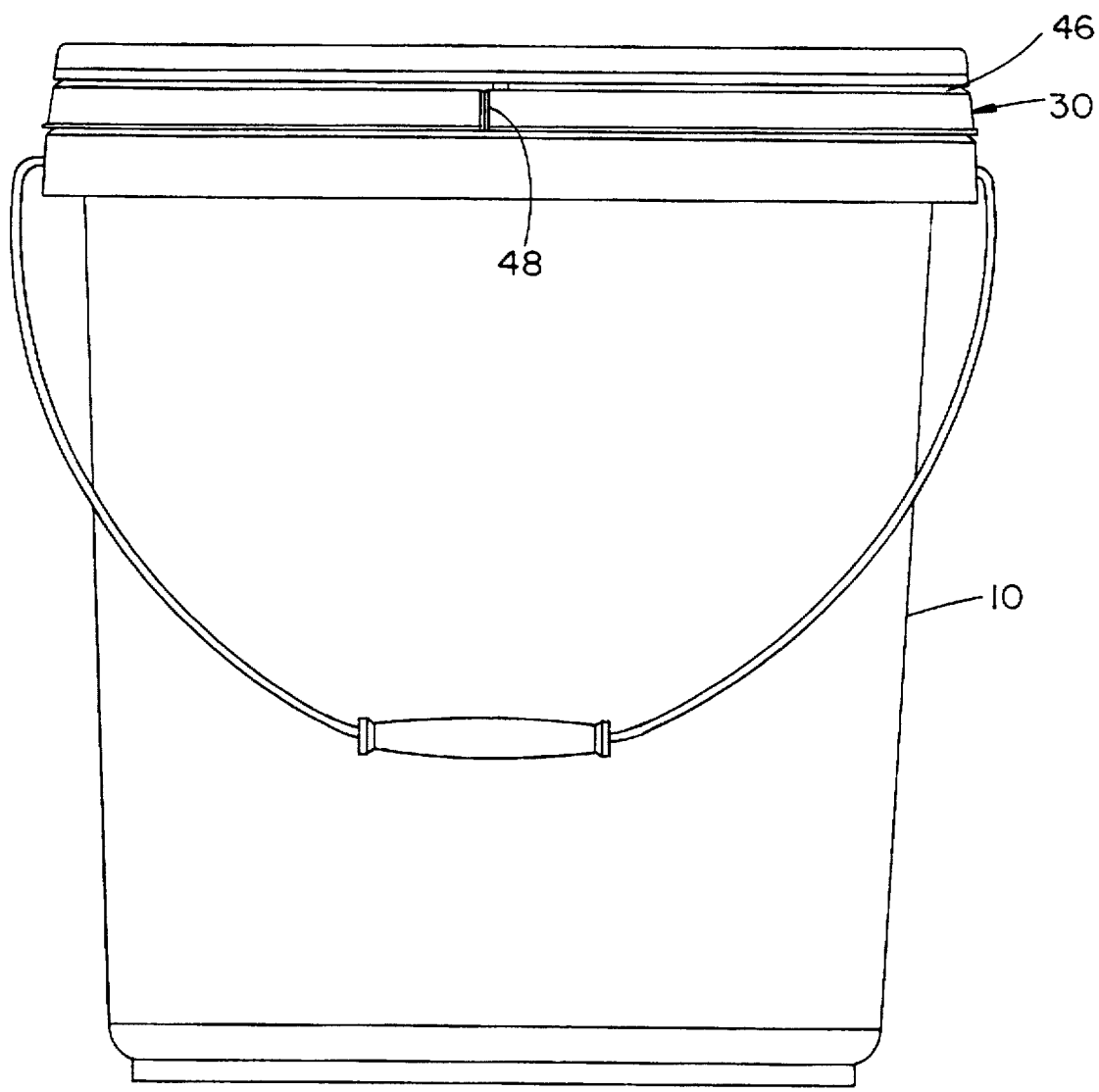
FIG. 2 is a side view of the embodiment shown in FIG. 1.
Figure 3:
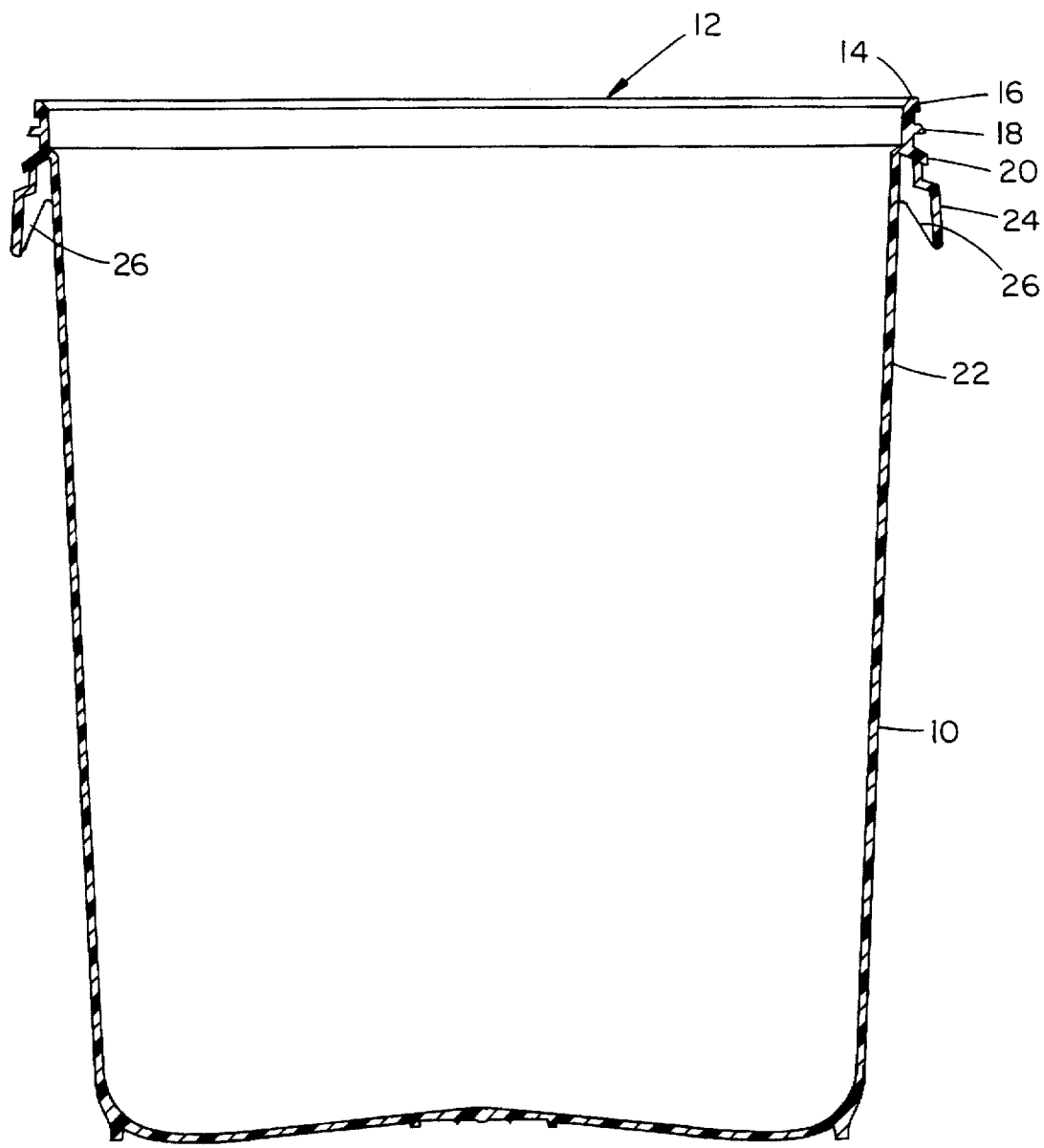
FIG. 3 is a vertical cross section of a plastic bucket without the cover.
Figure 4:
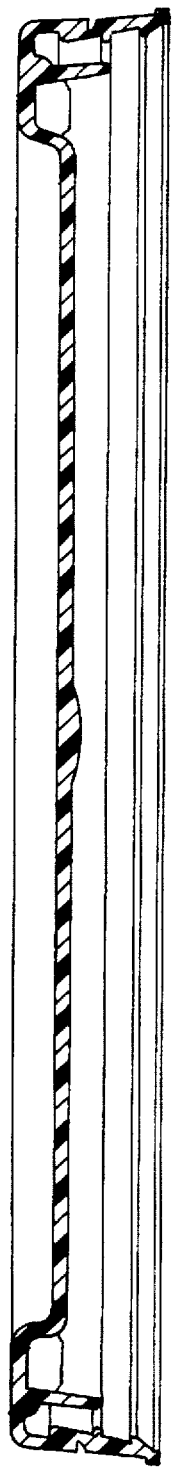
FIG. 4 is a cross-section of the cover and cover's edge.
Figure 5:
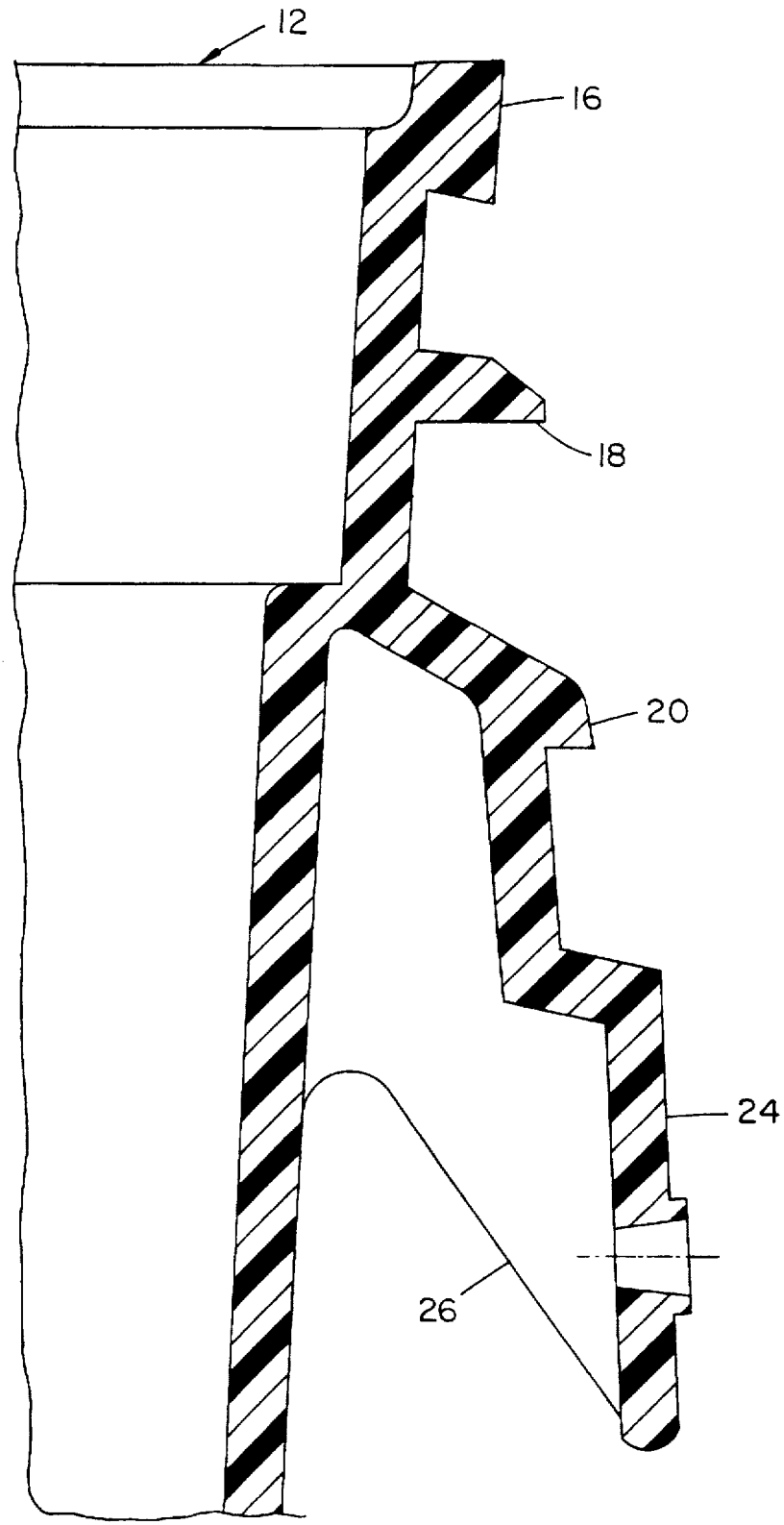
FIG. 5 is a detailed enlarged view of the container edge.
Figure 6:
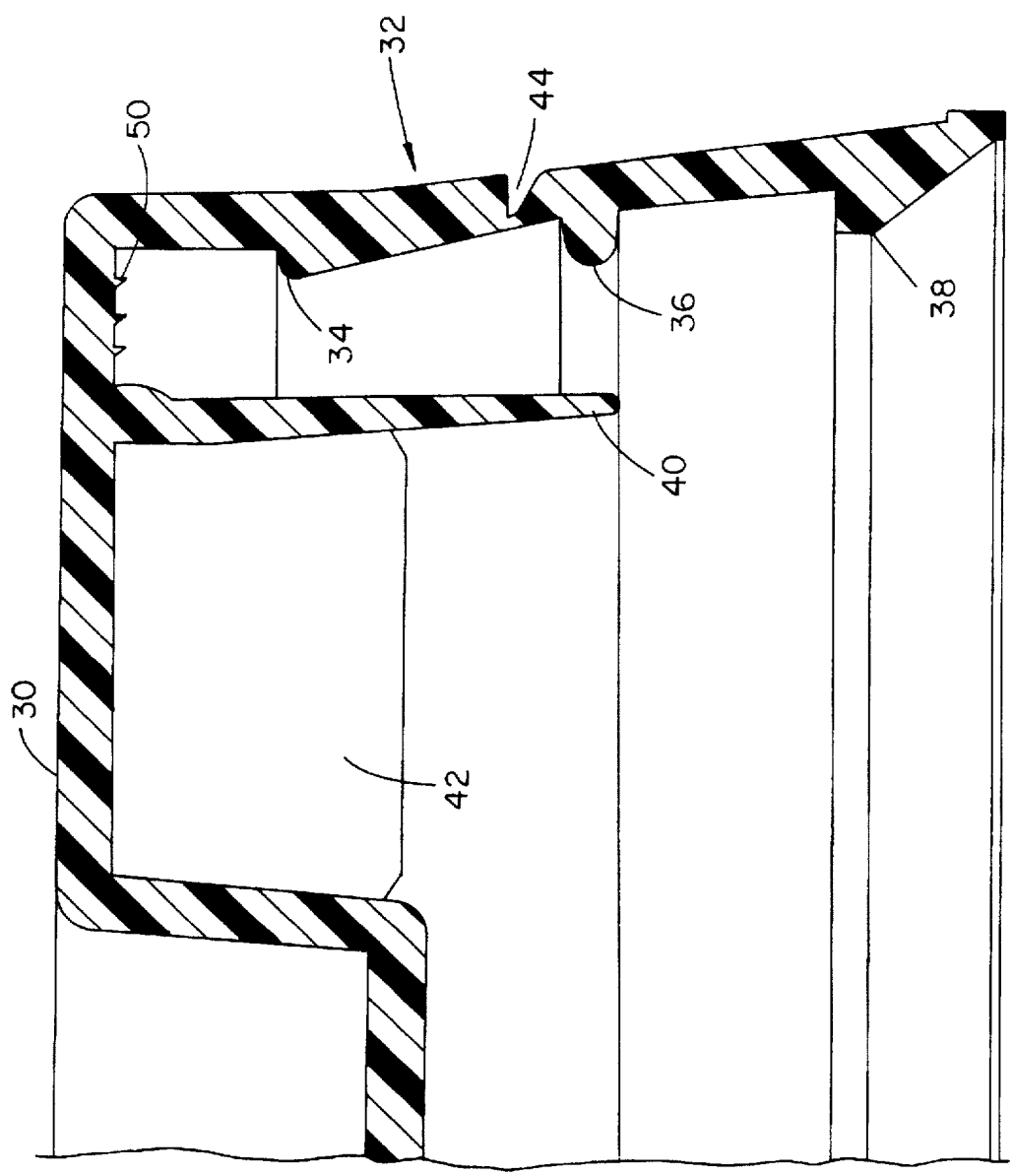
FIG. 6 is a detailed enlarged view of a cover lid.

The container body (10) has an open top (12) with a rim (14) therearound. The rim (14) includes three annular flanges (16, 18, 20) around and outside the rim, in a spatial arrangement extending from the top edge of the rim along an outside surface of the container body. The first annular flange (16) is at the extreme edge of the rim. The annular flange (20) furthest from the rim (14) extends marginally outwards and downwards around the side walls (22) of the container (10). The distance apart between adjacent annular flanges is constant around the container body. An annular skirt (24) extends radially outwards from the bottom surface of the furthest annular flange (20). To provide rigidity and to provide a means to absorb lateral impact force applied onto the skirt (24), a plurality of fins (26) is provided to connect the underside of the skirt and the container body. The fins (26) comprise a plurality of substantially vertical fins extending from the extreme lower inner edge of the skirt (24) to the furthest annular flange (20). From a side elevational view the fins (26) are not observable (See FIGS. 3,5 and 6).

The cover or lid (30) (best seen in axial cross-sectional view in FIG. 6) includes an annular skirt member (32) with a plurality of inside rings (34, 36, 38) in a spatial relationship corresponding to that of the three annular rings of the container body in the illustrated preferred embodiment. The first ring (34) is provided inside in the inner side of the annular skirt (32) and is configured to slip below and be in contact with the first annular flange (16) of the container body. (See FIG. 7). Similarly the second annular ring (36) is configured to slip below the second annular flange (18), and the third annular notch ring (36) is configured to slip below the third annular flange (20) of the container body. The lid (30) further includes an annular curtain (40) which is disposed beneath the lid and is disposed to fit into the container rim.

Figure 7:
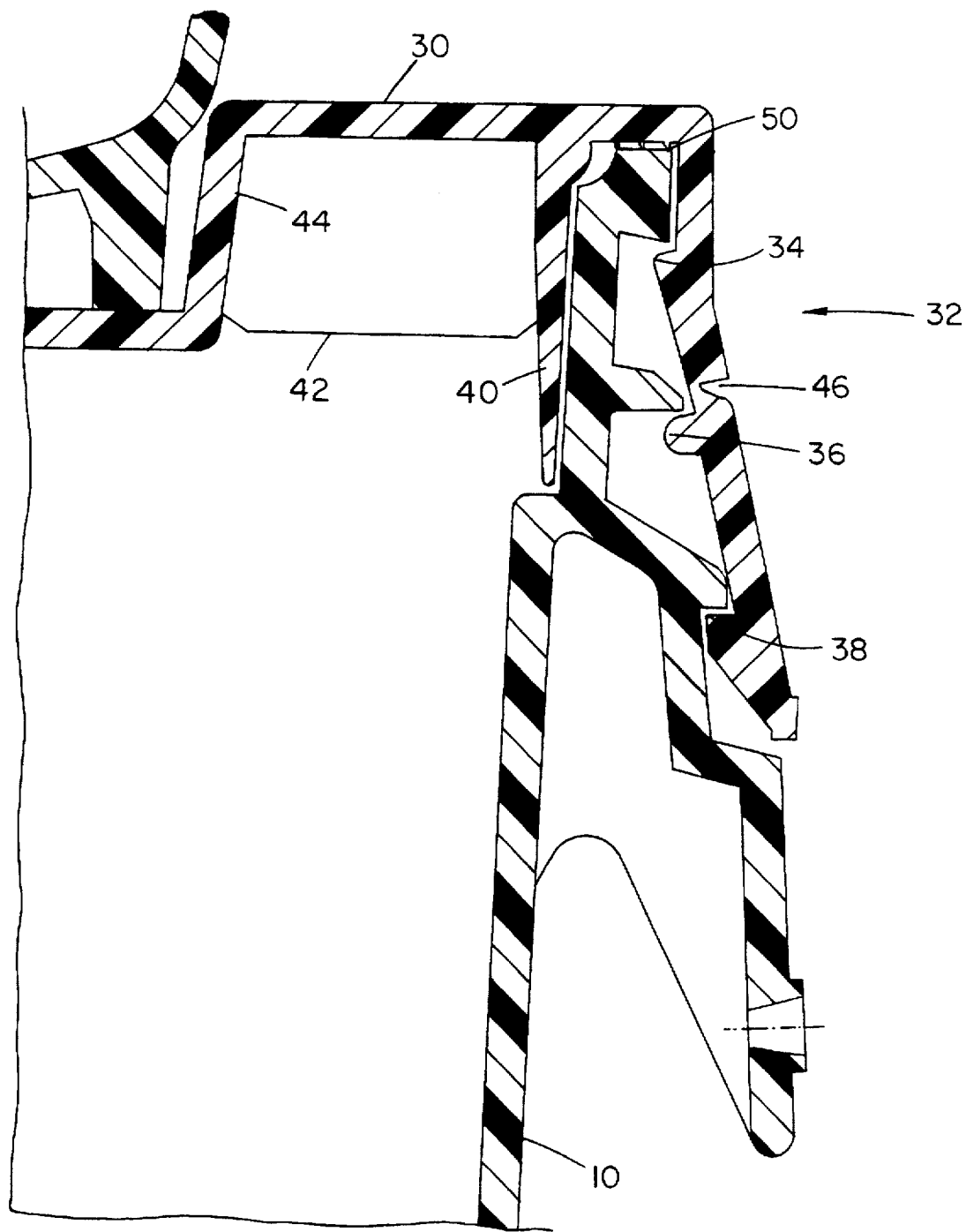
FIG. 7 is a vertical cross-section of the bucket and cover lid in its closed tightly locked position.
Figure 8:
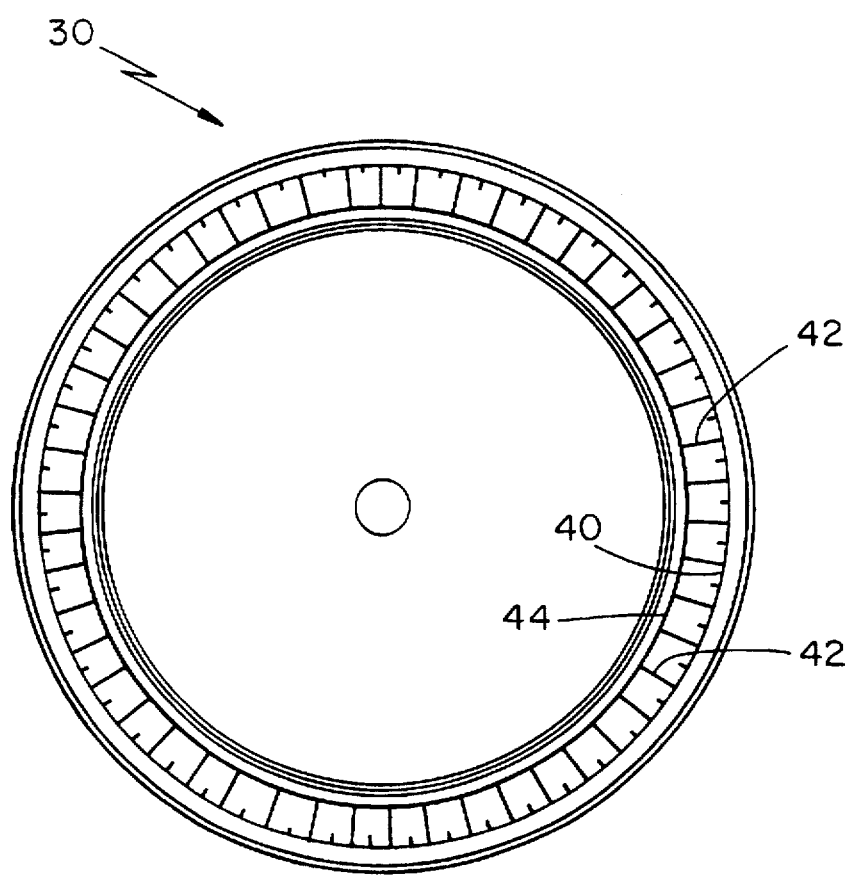
FIG. 8 is a plan view of the lid, looking into the lid from its open end.

The central region of the top of lid (30) is depressed, as to receive the base of another container placed on top of the lid of a covered container body (See FIG. 7). The cover includes a plurality of inside fins (42) connecting the annular curtain (40) and a depressed wall (44) portion of the lid to strengthen the distal end region of the lid see FIG. 8.

It will be observed that the annular flanges and the rings are designed and dimensionally configured to provide a tight fitting lid sealingly fitted over the container body.

In another aspect of the invention, a portion of the skirt member (32) of the lid below the annular first ring is formed to be detachable. A weakened portion of the skirt member is defined by an outside groove (46) provided between the first and second annular rings (34, 36) to enable the lower portion of the skirt member to be detached or torn off from the rest of the skirt member. To further enable the lower portion to be detached, a second weakened portion (48) is provided on the skirt (32). This weakened portion perferably is substantially perpendicular to the first weakened annular groove (46).

To prevent leakage of liquid from the container, a plurality of leak proof seal rings (50) are provided on the underside of the lid in the area which is in registration with the top edge of the container body. (See FIG. 6, & 7).

It will be appreciated that the lid sits easily over the container body. When pressure is applied from the top of lid vertically towards the container, the plurality of annular rings (34, 36, 38) snap into respective fastening fits over the corresponding annular flanges (16, 18, 20). Once in a closed position, the lid cannot easily be removed from the container body unless the tear off portion of the lid is detached from the annular skirt (32) of the lid (30). Once the tear off portion is removed it cannot be re-attached to the lid without showing evidence of tampering.

It will be appreciated by those skilled in the art that the number of annular flanges on the container body and the corresponding number of annular rings in the lid need not be limited to three as in the above described preferred embodiment.

The material used to make the container and the lid is preferably resiliently malleable plastic material. In the preferred embodiment, the container body material is a mixture of 70% of Poly Propylene Copolymer 2563H or 2500H and 30% of 2300K. The container lid is preferably made from a mixture of high density poly-ethylene R 1760, low density poly-ethylene JJ4324 and low density poly-ethylene LL2020 in the ratio 6:5:1 respectively.

It has been tested and found that a container sealed with liquid and put to the following tests did not break or leak the contents.

i) dropped vertically on base—1.5 meter
ii) dropped horizontally on side—1.0 meter
iii) dropped 45° on base—1.5 meter
iv) dropped 45° on lid—0.5 meter
v) dropped flat on lid—0.5 meter
vi) rolling on edge—3 meter high
vii) stacking—7-9 meter high The gross weight of the filled container in the above tests was 27 kg and the tests were conducted at an ambient temperature of 34° C.

The annular skirt (32) of the lid when fitted onto the rim (14) of the container is formed to fit substantially flush with annular skirt (24) of the container body.

While the invention has been described by means of a specific example and in a preferred embodiment, the invention is not intended to be limited thereto, for obvious modifications will occur to those skilled in the art without departing from the spirit and scope of the disclosed invention as recited in the appended claims.

Although the present invention has been described and illustrated in detail, it should be clearly understood that the same is by way of illustration and example only and is not to be taken by way of limitation, the spirit and scope of the present invention being limited only by the terms of the appended claims.

What is claimed:

1. A sealable container, comprising:

a container body having an open top with a rim therearound;

a plurality of annular flanges spaced apart in an axial direction of and extending radially outwards from an external wall of the container body, said flanges being integrally formed with the container body, wherein an annular flange located furthest from the rim includes an annular skirt extending radially outwards from an undersurface of the furthest-located annular flange;

a lid having an annular skirt which includes a plurality of annular rings formed therein in a relationship corresponding to the spaced apart relationship of the annular flanges of the container body, whereby each of the annular rings of the lid is snap-fastenable over a corresponding one of said annular flanges of the container body in a respective one-to-one relationship including said furthest-located annular flange; and an annular curtain disposed from an undersurface of the lid and configured to fit to an inner wall of the container body.

2. A sealable container as claimed in claim 1, wherein:

a plurality of container fins are disposed between the annular skirt of the container body and the external wall of the container body, said container fins being integrally formed with the annular skirt and the container body.

3. A sealable container as claimed in claim 1, wherein:

a plurality of lid fins are disposed between the annular curtain of the lid and an underneath of a top of the lid, said lid fins being integrally formed with the top of the lid and the annular curtain to extend therebetween in a radial direction.

4. A sealable container as claimed in claim 1, wherein:

the annular skirt of the lid includes an annular outside groove disposed therearound, a lower skirt portion below the annular outside groove being detachable thereat from the lid.

5. A sealable container as claimed in claim 4, wherein:

the annular outside groove is disposed above a penultimate annular ring relative to an open end of the lid.

6. A sealable container as claimed in claim 1, wherein:

the container body includes three annular flanges, and the lid includes three annular rings correspondingly formed and disposed to respectively fit thereto.

7. The sealable container according to claim 1, wherein:

the annular skirt extends from and below the underneath part of the furthest located annular flange.

8. The sealable container according to claim 1, wherein:

the container fins extend from a lower inner edge of the annular skirt to the furthest annular flange.

9. The sealable container according to claim 2, wherein:

a plurality of lid fins are disposed between the annular curtain of the lid and an underneath of a top of the lid, said lid fins being integrally formed with the top of the lid and the annular curtain to extend therebetween in a radial direction.

10. The sealable container according to claim 9, wherein:

the annular skirt of the lid includes an annular outside groove disposed therearound, a lower skirt portion below the annular outside groove being detachable thereat from the lid.

11. The sealable container according to claim 10, wherein:

the annular outside groove is disposed above a penultimate annular ring relative to an open end of the lid.

12. The sealable container according to claim 11, wherein:

the container body includes three annular flanges, and the lid includes three annular rings correspondingly formed and disposed to respectively fit thereto.

13. The sealable container according to claim 12, wherein:

the annular skirt extends below the underneath part of the furthest located annular flange.

14. The sealable container according to claim 13, wherein:

the container fins extend from a lower inner edge of the annular skirt to the furthest annular flange.

* * * * *